United States Patent
Kijima et al.

(10) Patent No.: US 12,503,612 B2
(45) Date of Patent: Dec. 23, 2025

(54) FLUORINE-CONTAINING ALCOHOL COMPOSITE

(71) Applicants: UNIMATEC CO., LTD., Tokyo (JP); HIROSAKI UNIVERSITY, Aomori (JP)

(72) Inventors: Tetsushi Kijima, Ibaraki (JP); Yasuhiko Akatsu, Ibaraki (JP); Hideo Sawada, Aomori (JP)

(73) Assignees: UNIMATEC CO., LTD., Tokyo (JP); HIROSAKI UNIVERSITY, Aomori (JP)

( * ) Notice: Subject to any disclaimer, the term of this patent is extended or adjusted under 35 U.S.C. 154(b) by 662 days.

(21) Appl. No.: 17/801,869

(22) PCT Filed: Dec. 15, 2020

(86) PCT No.: PCT/JP2020/046645
§ 371 (c)(1),
(2) Date: Aug. 24, 2022

(87) PCT Pub. No.: WO2021/171745
PCT Pub. Date: Sep. 2, 2021

(65) Prior Publication Data
US 2023/0093691 A1 Mar. 23, 2023

(30) Foreign Application Priority Data
Feb. 27, 2020 (JP) .................. 2020-031493

(51) Int. Cl.
*C09D 7/65* (2018.01)
*C09D 5/00* (2006.01)
*C09D 7/61* (2018.01)
*C09D 129/04* (2006.01)

(52) U.S. Cl.
CPC .................. *C09D 7/65* (2018.01); *C09D 5/00* (2013.01); *C09D 7/61* (2018.01); *C09D 129/04* (2013.01)

(58) Field of Classification Search
CPC ... C09D 7/65; C09D 5/00; C09D 7/61; C09D 129/04; C09D 7/63; C09D 5/1668; C09D 171/00; C08G 65/007; C08G 65/3311; C08G 65/336; C08G 65/338; C08G 65/34; C08G 77/42; C08G 79/00; C08K 2003/2244; C08K 5/5415; C08K 3/16; C08K 5/053; C03C 2217/75; C03C 2217/76; C03C 17/30; C03C 17/328; C08L 29/04; C08L 101/06; C09K 3/185
See application file for complete search history.

(56) References Cited

U.S. PATENT DOCUMENTS

| | | | |
|---|---|---|---|
| 3,574,770 | A | 4/1971 | Stump, Jr. et al. |
| 6,337,370 | B1 | 1/2002 | Bae et al. |
| 11,174,349 | B2 | 11/2021 | Mitsuhashi et al. |
| 2001/0031850 | A1* | 10/2001 | Mohri .................. C09D 143/04 528/42 |
| 2017/0015833 | A1* | 1/2017 | Fukushima .............. B01J 35/00 |
| 2019/0390009 | A1 | 12/2019 | Mitsuhashi et al. |

FOREIGN PATENT DOCUMENTS

| | | |
|---|---|---|
| JP | 5-125083 A | 5/1993 |
| JP | 5-147943 A | 6/1993 |
| JP | 2001-11119 A | 1/2001 |
| JP | 2003-268309 A | 9/2003 |
| JP | 2008-38015 A | 2/2008 |
| JP | 2009-29882 A | 2/2009 |
| JP | 2009191101 A * | 8/2009 |
| JP | 2017-88845 A | 5/2017 |
| JP | 2017-105975 A | 6/2017 |
| JP | 2018-145251 A | 9/2018 |
| JP | 2019-183160 A | 10/2019 |
| WO | 2015/137345 A1 | 9/2015 |
| WO | 2017/033532 A1 | 3/2017 |

OTHER PUBLICATIONS

Ito, JP2009191101-MT (Year: 2009).*
International Search Report and Written Opinion of the International Searching Authority issued in International WIPO Patent Application No. PCT/JP2020/046645, dated Feb. 22, 2021, along with an English translation thereof.
International Preliminary Report on Patentability in International Patent Application No. PCT/JP2020/046645, dated Sep. 9, 2022, along with an English translation thereof.

* cited by examiner

*Primary Examiner* — Mark Eashoo
*Assistant Examiner* — Zhen Liu
(74) *Attorney, Agent, or Firm* — GREENBLUM & BERNSTEIN, P.L.C.

(57) ABSTRACT

A fluorine-containing alcohol composite comprising a condensate of a fluorine-containing alcohol represented by the general formula: HO-A-$R_F$-A-OH [I] (wherein $R_F$ is a group containing a perfluoroalkylene group or a polyfluoroalkylene group having 6 or less carbon atoms and an ether bond, and A is an alkylene group having 1 to 3 carbon atoms), a hydroxyl group-containing polymer, and a zirconium compound. The fluorine-containing alcohol composite, using a fluorine-containing alcohol, does not produce perfluorooctanoic acid and the like when released into the environment and that has a unit easily decomposed into short chain compounds. And also, it exhibits hydrophilic oil repellency.

13 Claims, No Drawings

FLUORINE-CONTAINING ALCOHOL COMPOSITE

TECHNICAL FIELD

The present disclosure relates to fluorine-containing alcohol composite. More particularly, the present disclosure relates to fluorine-containing alcohol composite, that is used as an active ingredient of a surface treatment agent, such as hydrophilic oil repellent agent.

BACKGROUND ART

Regarding a substrate surface-treated with a surface treatment agent, which is generally used as a water and oil repellent agent, when water vapor or the like adheres to the surface of the water repellent substrate, it is water-repelled and adheres to the surface as minute droplets, resulting in the cloudy state.

For example, the surfaces of automobile window glasses, camera lenses, bathroom mirrors, etc. are required to have anti-fog properties in order to improve visibility. To express anti-fog properties, the surfaces need to be hydrophilic to form a water film from tiny water droplets that cause cloudiness.

As a method for imparting anti-fog properties to a substrate surface, Patent Document 1 discloses an anti-fog coating comprising a urethane resin having an oxyethylene group, an oxypropylene group, and an acyl group, wherein the anti-fog coating contains a fluorine-containing surfactant, the surface thickness of the fluorine-containing surfactant in the anti-fog coating is 0.001 to 2% of the thickness of the coating, and the ratio of the number of fluorine atoms to the number of all the atoms observed on the surface of the anti-fog coating through elementary analysis of the coating is 5 to 30%.

It is also desired to subject the surfaces of automobile window glasses, camera lenses, bathroom mirrors, etc. to antifouling treatment because the appearance of these surfaces is spoiled by oil and fat stains such as fingerprints, and the function of the products is also degraded.

As an antifouling treatment method. Patent Document 2 indicates that a compound represented by the general formula [Ia] or [Ib]:

$$(Rf\text{-}PFPE)_\beta\text{-}X\text{---}(CR^a_k R^b_l R^c_m)_\alpha \quad [Ia]$$

$$(R^c_m R^b_l R^a_k C)_\alpha\text{-}X\text{-}PFPE\text{-}X\text{---}(CR^a_k R^b_l R^c_m)_\alpha \quad [Ib]$$

is used as a perfluoro(poly)ether group-containing silane compound that has water repellency, oil repellency, and antifouling properties, and that is capable of forming a layer having high abrasion durability.

However, this perfluoro(poly)ether group-containing silane compound exhibits oil repellency and antifouling properties, and also exhibits water repellency at the same time.

Moreover, as a hydrophilic oil repellent agent that is applied to a substrate surface and that has both hydrophilicity and oil repellency for preventing adhesion of oil and fat and water scale, Patent Document 3 discloses a fluorine-containing polymer comprising a repeating unit (2):

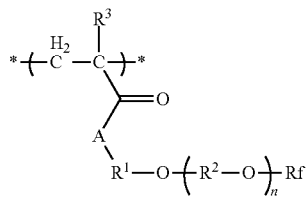
(2)

A: —O—, —NH—
$R^1$: methylene group, ethylene group
$R^2$: methylene group, ethylene group, propylene group
Rf: $C_2$-$C_8$ fluorine-containing alkyl group
$R^3$: hydrogen atom, methyl group,
n: an integer of 0 to 50
*: a bond

PRIOR ART DOCUMENTS

Patent Documents

Patent Document 1: WO 2017/033532 A1
Patent Document 2: JP-A-2019-183160
Patent Document 3: JP-A-2017-105975
Patent Document 4: JP-A-2008-038015
Patent Document 5: U.S. Pat. No. 3,574,770
Patent Document 6: JP-A-5-147943

OUTLINE OF THE INVENTION

Problem to be Solved by the Invention

An object of the present disclosure is to provide a composite that exhibits hydrophilic oil repellency using a fluorine-containing alcohol that does not produce perfluorooctanoic acid and the like when released into the environment, and that has a unit easily decomposed into short chain compounds.

Means for Solving the Problem

The above object of the present disclosure can be achieved by a fluorine-containing alcohol composite comprising a condensate of a fluorine-containing alcohol represented by the general formula:

$$\text{HO-A-}R_F\text{-A-OH} \quad [1]$$

(wherein $R_F$ is a group containing a perfluoroalkylene group or a polyfluoroalkylene group having 6 or less carbon atoms, and an ether bond, and A is an alkylene group having 1 to 3 carbon atoms), a hydroxyl group-containing polymer, and a zirconium compound.

The condensate that forms the composite is produced by subjecting each of the above components to a condensation reaction using a basic or acidic catalyst. In the reaction, an organic silicon compound can also be allowed to coexist in the reaction system.

Effect of the Invention

The fluorine-containing alcohol used in the composite according to the present disclosure does not produce perfluorooctanoic acid and the like when released into the environment, has a unit easily decomposed into short chain compounds, and also has oil repellency. Moreover, the hydroxyl group-containing polymer such as polyvinyl alcohol and the zirconium compound have hydrophilicity. Therefore, a composite comprising a condensate obtained by reacting these components exhibits hydrophilic oil repellency, and is effectively used as a coating agent for inorganic substrates such as glass, metal and stone, as well as organic substrates such as various plastics and rubber.

Moreover, the composite exhibits hydrophilic oil repellency and thus has anti-fog properties. If it is hydrophilic, it wets and spreads on the surface of the liquid, thus forming a liquid film, and the surface is wet but not cloudy. A coating film formed from this composite is colorless and transparent, and can therefore be applied without impairing the appearance of the substrate.

Furthermore, due to the hydrolysis of the zirconium compound and the condensation reaction, excellent adhesion to the substrate is obtained, and the hydrophilic oil repellency on the surface of the substrate is maintained.

Embodiments for Carrying Out the Invention

As the fluorine-containing alcohol, compounds represented by the general formula:

HO-A-$R_F$-A-OH  [I]

$R_F$: a group containing a $C_6$ or less perfluoroalkylene group and an ether bond, specifically a group containing a linear or branched perfluoroalkylene group having 5 to 160 carbon atoms; or
a polyfluoroalkylene group obtained by replacing some of the fluorine atoms of the perfluoroalkylene group with hydrogen atoms, and containing an ether bond
A: an alkylene group having 1 to 3 carbon atoms;
are used.

Examples of the fluorine-containing alcohol represented by the general formula [1] include compounds represented by the general formula:

HO(CH$_2$)$_a$C$_m$F$_{2m}$(OC$_n$F$_{2n}$)$_b$O(CF$_2$)$_c$O(C$_n$F$_{2n}$O)$_d$C$_m$F$_{2m}$(CH$_2$)$_a$OH  [II]

a: 1 to 3
b+d: 0 to 50
c: to 6
m: 1 to 2
n: 1 to 3

As the fluorine-containing alcohols represented by the general formula [II], compounds represented by the general formula:

HO(CH$_2$)$_a$CF(CF$_3$)[OCF$_2$CF(CF$_3$)]$_b$O(CF$_2$)$_c$O[CF(CF$_3$)CF$_2$O]$_d$CF(CF$_3$)(CH$_2$)$_a$OH  [III]

a: 1 to 3, preferably 1
b+d: 0 to 50, preferably 1 to 20
  Regrading the value b+d, a mixture with a distribution may be used
c: 1 to 6, preferably 2 to 4
and the like are used.

Perfluoroalkylene ether diols of the above formula [11] wherein a=1 are disclosed in Patent Documents 4 and 5, and synthesized via the following series of steps:

FOCRfCOF→H$_3$COOCRfOOCH$_3$→HOCH$_2$RfCH$_2$OH
Rf: —C(CF$_3$)[OCF$_2$C(CF$_3$)]$_b$O(CF$_2$)$_c$O[CF(CF$_3$)CF$_2$O]$_d$CF(CF$_3$)—

The fluorine-containing alcohol, the hydroxyl group-containing polymer, and the zirconium compound are reacted in the presence of a basic or acidic catalyst, thereby forming a composite.

As the hydroxyl group-containing polymer, polyvinyl alcohols with various degrees of saponification obtained by saponifying polyvinyl acetate are preferably used. The polyvinyl alcohol is used at a ratio about 0.5 to 10 times, preferably about 0.5 to 5 times, based on the fluorine-containing alcohol. If the polyvinyl alcohol is used at a ratio smaller than the above range, hydrophilicity is insufficient.

Moreover, as the zirconium compound, di-n-butoxyzirconium bis(acetylacetonate), di-n-butoxyzirconium bis(ethylacetoacetate), or the like can also be used; however, zirconium chloride, zirconium hydroxide, or zirconium oxychloride ZrCl$_2$O.8H$_2$O, which produces them by reaction, is preferably used (see Patent Document 6). Such a zirconium compound is also used in the similar amount to that of the polyvinyl alcohol.

Further, an organic silicon compound can be allowed to coexist in the reaction system. Examples thereof include tetra lower alkyl orthosilicate containing a lower alkyl group having 1 to 5 carbon atoms, such as tetramethoxysilane, tetraethoxysilane, tetrapropoxysilane, tetrabutoxysilane, trimethoxymethylsilane, triethoxymethylsilane, trimethoxyethylsilane and triethoxycthylsilane; triethoxychlorosilane; trimethoxyphenylsilane: triethoxyphenylsilane; and the like, and they can be used at a n about 5 times or less ratio based on the fluorine-containing alcohol.

The condensation reaction is carried out in a solvent (e.g., alcohols such as methanol, ethanol and isopropanol; ketones such as acetone and methyl isobutyl ketone; and esters such as methyl acetate and ethyl acetate) in the presence of the following basic or acidic catalyst. At that time, the zirconium compound is added as such an organic solvent solution.

The reaction between each of these components is carried out, for example, in the presence of a catalytic amount of a basic catalyst or an acidic catalyst (e.g., ammonia water; an aqueous solution of a hydroxide of an alkali metal or alkaline earth metal, such as sodium hydroxide, potassium hydroxide or calcium hydroxide; or hydrochloric acid or sulfuric acid; and the like) at a temperature of about 0 to 100° C., preferably about 10 to 30° C., for about 0.5 to 48 hours, preferably about 1 to 10 hours.

Using the reaction mixture as it is or after adjusting its solid matters content to about 0.5 to 5 wt. % by an organic solvent, the surface treatment agent having hydrophilic oil repellency is applied to the surface of the substrate in a coating amount (basis weight) of about 30 to 1,000 mg/m², preferably about 100 to 1,000 mg/m², by a method such as dipping, spraying, brushing or roll coating, and dried at room temperature or warm air, followed by baking at about 100 to 250° C. for about 0.1 to 20 hours to form a coating.

EXAMPLES

The following describes the present disclosure with reference to Examples.
[Examples Using a Basic Catalyst]

Example 1

In a reaction container with a capacity of 13 ml, 10 mg of a fluorine-containing alcohol:

HOCH$_2$CF(CF$_3$)[OCF$_2$CF(CF$_3$)]$_b$O(CF$_2$)$_2$O[CF(CF$_3$)CFO$_2$O]$_d$CF(CF$_3$)CH$_2$OH [OXF9DOH,b+d=7], 25 mg of polyvinyl alcohol (Kuraray Poval LM10-HD, produced by Kuraray Co., Ltd.), and 4 ml of ethanol were charged, and 1 ml (25 mg as zirconium oxychloride) of an ethanol solution of zirconium oxychloride (concentration: 0.025 g/ml) was added thereto, followed by stirring for 10 minutes. Then, 1 ml of a 25 wt. % ammonia aqueous solution was added as dropwise while stirring, followed by stirring under room temperature conditions for 5 hours.

0.35 ml of the obtained reaction solution was added as dropwise on a glass plate (Matsunami Cover Glass (18×18 mm), produced by Matsunami Glass Ind., Ltd.), and dried under room temperature conditions, followed by heat treatment at 150° C. for 2 hours.

Measurement of Static Contact Angle:
- 2 µl of droplets of n-dodecane or water were gently brought into contact with the obtained glass surface, and the contact angle (unit: °) of the attached droplets was measured by the θ/2 method using a contact angle meter (Drop Master 300, produced by Kyowa Interface Science Co., Ltd.). The contact angle with respect to water was measured over time.

Coating Film Durability Test:
- The treated glass plate was cleaned by dipping in ion exchange water for 20 minutes, and then dried under room temperature conditions for 1 day, thereby obtaining a sample after cleaning. The static contact angle of the sample after cleaning was measured.

Evaluation of Oil Repellency and Hydrophilicity:
- Regarding oil repellency, a static contact angle of 40° or more was evaluated as ○, and 30° or more and less than 40° was evaluated as Δ. Regarding hydrophilicity, a static contact angle of 30° or less was evaluated as ○, and more than 30° was evaluated as X.

Regarding the sample before cleaning and after cleaning, the appearance of the glass plate was visually observed and evaluated as follows. Colorless and transparent: ○; partially discolored or cloudy: Δ; and completely discolored or cloudy: X.

Example 2

In Example 1, the amount of fluorine-containing alcohol OXF9DOH was changed to 30 mg.

Example 3

In Example 2, 1 ml (50 mg as TEOS) of an ethanol solution (concentration: 0.05 g/ml) of tetraethyl orthosilicate [TEOS] was further used, and the amount of ethanol was changed to 5 ml.

Example 4

In Example 1, the same amount (10 mg) of
$HOCH_2CF(CF_3)[OCF_2CF(CF_3)]_bO(CF_2)_2O[CF(CF_3)CFO_2O]_dCF(CF_3)CH_2OH$ [OXF3DOH, $b+d=1$]
was used as the fluorine-containing alcohol.

Example 5

In Example 4, 50 mg of TEOS was further used, and the amount of ethanol was changed to 5 ml.

Example 6

In Example 4, the amount of fluorine-containing alcohol OXF3DOH was changed to 30 mg.

Example 7

In Example 6, 50 mg of TEOS was further used, and the amount of ethanol was changed to 5 ml.

[Examples Using an Acidic Catalyst]

Example 8

In Example 1, the same amount (1 ml) of 0.1N hydrochloric acid was used in place of the 25 wt. % ammonia aqueous solution.

Example 9

In Example 8, 50 mg of TEOS was further used, and the amount of ethanol was changed to 5 ml.

Example 10

In Example 8, the amount of fluorine-containing alcohol OXF9DOH was changed to 30 mg.

Example 11

In Example 10, 50 mg of TEOS was further used, and the amount of ethanol was changed to 5 ml.

Example 12

In Example 5, the same amount (1 ml) of 0.1N hydrochloric acid was used in place of the 25 wt. % ammonia aqueous solution.

Example 13

In Example 6, the same amount (1 ml) of 0.1N hydrochloric acid was used in place of the 25 wt. % ammonia aqueous solution.

Example 14

In Example 7, the same amount (1 ml) of 0.1N hydrochloric acid was used in place of the 25 wt. % ammonia aqueous solution.

[Comparative Example Using a Basic Catalyst]

Comparative Example 1

In Example 1, polyvinyl alcohol was not used.

Comparative Example 2

In Example 1, polyvinyl alcohol was not used and 50 mg of TEOS was used.

Comparative Example 3

In Example 2, polyvinyl alcohol was not used.

Comparative Example 4

In Example 3, polyvinyl alcohol was not used.

Comparative Example 5

In Example 4, polyvinyl alcohol was not used.

Comparative Example 6

In Example 5, polyvinyl alcohol was not used.

Comparative Example 7

In Example 6, polyvinyl alcohol was not used.
[Comparative Example Using an Acidic Catalyst]

Comparative Example 8

In Example 8, polyvinyl alcohol was not used.

Comparative Example 9

In Example 9, polyvinyl alcohol was not used.

Comparative Example 10

In Example 10, polyvinyl alcohol was not used.

Comparative Example 11

In Example 11, polyvinyl alcohol was not used.

Comparative Example 12

In Example 12, polyvinyl alcohol and TEOS were not used.

Comparative Example 13

In Example 12, polyvinyl alcohol was not used.

Comparative Example 14

In Example 13, polyvinyl alcohol was not used.

Comparative Example 15

In Example 14, polyvinyl alcohol was not used.

The results obtained in the above Examples and Comparative Examples are shown in the following Table 1.

TABLE 1

| Example | Static contact angle before cleaning(°) | | | | | | | | oil repellency | hydrophilicity | Static contact angle after cleaning(°) |
|---|---|---|---|---|---|---|---|---|---|---|---|
| | Dodecane | Water (min) | | | | | | | | | Dodecane |
| | | 0 | 5 | 10 | 15 | 20 | 25 | 30 | | | |
| Example 1 | 61 | 92 | 18 | 11 | 0 | 0 | 0 | 0 | ○ | ○ | 83 |
| Example 2 | 61 | 84 | 21 | 15 | 0 | 0 | 0 | 0 | ○ | ○ | 63 |
| Example 3 | 60 | 80 | 21 | 15 | 0 | 0 | 0 | 0 | ○ | ○ | 85 |
| Example 4 | 58 | 83 | 33 | 28 | 24 | 20 | 15 | 0 | ○ | ○ | 40 |
| Example 5 | 59 | 82 | 32 | 26 | 24 | 17 | 18 | 0 | ○ | ○ | 44 |
| Example 6 | 57 | 75 | 31 | 27 | 21 | 16 | 13 | 0 | ○ | ○ | 42 |
| Example 7 | 57 | 75 | 31 | 27 | 22 | 18 | 14 | 0 | ○ | ○ | 46 |
| Example 8 | 58 | 103 | 45 | 31 | 24 | 18 | 17 | 16 | ○ | ○ | 59 |
| Example 9 | 58 | 112 | 23 | 16 | 11 | 0 | 0 | 03 | ○ | ○ | 58 |
| Example 10 | 61 | 101 | 43 | 37 | 34 | 32 | 27 | 27 | ○ | ○ | 58 |
| Example 11 | 61 | 124 | 54 | 34 | 25 | 23 | 19 | 18 | ○ | ○ | 57 |
| Example 12 | 48 | 110 | 65 | 44 | 33 | 29 | 26 | 27 | ○ | ○ | 36 |
| Example 13 | 47 | 103 | 53 | 35 | 27 | 23 | 21 | 18 | ○ | ○ | 18 |
| Example 14 | 52 | 95 | 68 | 50 | 42 | 42 | 31 | 26 | ○ | ○ | 43 |
| Comparative Example 1 | 60 | 100 | 100 | 96 | 93 | 93 | 93 | 93 | ○ | x | 81 |
| Comparative Example 2 | 82 | 86 | 87 | 87 | 83 | 83 | 83 | 83 | ○ | x | 61 |
| Comparative Example 3 | 57 | 81 | 76 | 73 | 70 | 70 | 70 | 70 | ○ | x | 60 |
| Comparative Example 4 | 59 | 93 | 78 | 67 | 63 | 63 | 83 | 83 | ○ | x | 59 |
| Comparative Example 5 | 39 | 94 | 92 | 91 | 91 | 91 | 81 | 91 | Δ | x | 52 |
| Comparative Example 6 | 49 | 85 | 79 | 76 | 74 | 69 | 65 | 68 | ○ | x | 50 |
| Comparative Example 7 | 42 | 87 | 87 | 85 | 85 | 85 | 85 | 85 | ○ | x | 40 |
| Comparative Example 8 | 58 | 80 | 70 | 74 | 69 | 64 | 64 | 64 | ○ | x | 40 |
| Comparative Example 9 | 49 | 103 | 92 | 92 | 92 | 92 | 92 | 92 | ○ | x | 83 |
| Comparative Example 10 | 55 | 83 | 64 | 64 | 64 | 64 | 84 | 84 | ○ | x | 32 |
| Comparative Example 11 | 52 | 78 | 75 | 71 | 71 | 71 | 71 | 71 | ○ | x | 54 |
| Comparative Example 12 | 36 | 58 | 52 | 48 | 48 | 42 | 36 | 36 | Δ | x | 42 |
| Comparative Example 13 | 49 | 70 | 67 | 67 | 67 | 67 | 67 | 67 | ○ | x | 49 |
| Comparative Example 14 | 64 | 64 | 60 | 59 | 57 | 57 | 57 | 57 | ○ | x | 50 |
| Comparative Example 15 | 42 | 68 | 61 | 61 | 61 | 61 | 81 | 81 | ○ | x | 42 |

TABLE 1-continued

| | | Static contact angle after cleaning(°) | | | | | | | | Appearance of modified glass | |
| | | Water (min) | | | | | | oil | | Before | After |
| Example | 0 | 5 | 10 | 15 | 20 | 25 | 30 | repellency | hydrophilicity | cleaning | cleaning |
|---|---|---|---|---|---|---|---|---|---|---|---|
| Example 1 | 100 | 28 | 24 | 22 | 18 | 18 | 13 | ○ | ○ | ○ | ○ |
| Example 2 | 101 | 34 | 29 | 27 | 24 | 21 | 10 | ○ | ○ | ○ | ○ |
| Example 3 | 73 | 33 | 28 | 23 | 20 | 18 | 12 | ○ | ○ | ○ | ○ |
| Example 4 | 80 | 15 | 11 | 0 | 0 | 0 | 0 | ○ | ○ | ○ | ○ |
| Example 5 | 73 | 12 | 0 | 0 | 0 | 0 | 0 | ○ | ○ | ○ | ○ |
| Example 6 | 71 | 18 | 12 | 0 | 0 | 0 | 0 | ○ | ○ | ○ | ○ |
| Example 7 | 85 | 11 | 0 | 0 | 0 | 0 | 0 | ○ | ○ | ○ | ○ |
| Example 8 | 113 | 56 | 38 | 30 | 26 | 20 | 17 | ○ | ○ | ○ | ○ |
| Example 9 | 102 | 15 | 8 | 0 | 0 | 0 | 0 | ○ | ○ | ○ | ○ |
| Example 10 | 107 | 46 | 39 | 35 | 32 | 27 | 23 | ○ | ○ | ○ | ○ |
| Example 11 | 106 | 45 | 32 | 27 | 25 | 21 | 20 | ○ | ○ | ○ | ○ |
| Example 12 | 80 | 47 | 36 | 28 | 25 | 22 | 18 | Δ | ○ | ○ | ○ |
| Example 13 | 65 | 40 | 31 | 25 | 22 | 18 | 16 | Δ | ○ | ○ | ○ |
| Example 14 | 85 | 40 | 34 | 30 | 28 | 23 | 23 | ○ | ○ | ○ | ○ |
| Comparative Example 1 | 94 | 81 | 78 | 74 | 71 | 71 | 71 | ○ | x | ○ | ○ |
| Comparative Example 2 | 98 | 78 | 75 | 72 | 65 | 66 | 65 | ○ | x | ○ | ○ |
| Comparative Example 3 | 95 | 84 | 84 | 79 | 75 | 72 | 72 | ○ | x | ○ | ○ |
| Comparative Example 4 | 89 | 81 | 79 | 76 | 72 | 67 | 67 | ○ | x | ○ | ○ |
| Comparative Example 5 | 71 | 65 | 82 | 58 | 53 | 47 | 47 | ○ | x | ○ | ○ |
| Comparative Example 6 | 65 | 58 | 58 | 51 | 47 | 47 | 47 | ○ | x | ○ | ○ |
| Comparative Example 7 | 68 | 54 | 61 | 58 | 53 | 47 | 47 | ○ | x | ○ | ○ |
| Comparative Example 8 | 88 | 75 | 71 | 64 | 61 | 61 | 61 | ○ | x | ○ | ○ |
| Comparative Example 9 | 103 | 95 | 92 | 92 | 92 | 92 | 92 | ○ | x | ○ | ○ |
| Comparative Example 10 | 87 | 74 | 70 | 70 | 70 | 70 | 70 | Δ | x | ○ | ○ |
| Comparative Example 11 | 78 | 50 | 85 | 85 | 65 | 65 | 65 | ○ | x | ○ | ○ |
| Comparative Example 12 | 56 | 50 | 45 | 43 | 35 | 35 | 35 | ○ | x | ○ | ○ |
| Comparative Example 13 | 74 | 70 | 65 | 65 | 65 | 65 | 65 | ○ | x | ○ | ○ |
| Comparative Example 14 | 75 | 58 | 57 | 57 | 57 | 57 | 57 | ○ | x | ○ | ○ |
| Comparative Example 15 | 67 | 81 | 56 | 56 | 56 | 56 | 58 | ○ | x | Δ | Δ |

Examples 15 to 19

The anti-fog properties of the glass plates obtained in Examples 4 to 7 and 9 were evaluated in the following manner.

A beaker was filled with boiling water (about 90° C.), and each of the coated glass plates was placed above (3 cm above) the beaker. The glass plates not clouded with steam were evaluated as ○, and the glass plates clouded with steam were evaluated as X.

The results obtained are shown in the following Table 2.

TABLE 2

| Example | Coated glass plates Example | Before cleaning | After cleaning |
|---|---|---|---|
| 15 | 4 | ○ | ○ |
| 16 | 5 | ○ | ○ |
| 17 | 6 | ○ | ○ |
| 18 | 7 | ○ | ○ |
| 19 | 9 | ○ | ○ |

The invention claimed is:

1. A fluorine-containing alcohol composite comprising a condensate of:
a fluorine-containing alcohol represented by the general formula:

$$HO-A-R_F-A-OH \qquad [I]$$

wherein $R_F$ is a group containing a perfluoroalkylene group or a polyfluoroalkylene group having 6 or less carbon atoms, and an ether bond, and A is an alkylene group having 1 to 3 carbon atoms,
a hydroxyl group-containing polymer, and
a zirconium compound; wherein
the fluorine-containing alcohol, the hydroxyl group-containing polymer, and the zirconium compound are subjected to a condensation reaction in the presence of a basic or acidic catalyst to form the fluorine-containing alcohol composite.

2. The fluorine-containing alcohol composite according to claim 1, wherein organic silicon compound is further comprised.

3. The fluorine-containing alcohol composite according to claim 1, wherein as the fluorine-containing alcohol represented by the general formula [I], a perfluoroalkylene ether diols represented by the general formula:

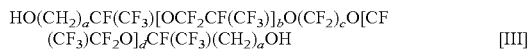
[III]

wherein a is an integer of 1 to 3, b+d is an integer of 0 to 50, and c is an integer of 1 to 6 is used.

4. The fluorine-containing alcohol composite according to claim 1, wherein the hydroxyl group-containing polymer is polyvinyl alcohol.

5. The fluorine-containing alcohol composite according to claim 1, wherein the zirconium compound is zirconium oxychloride.

6. The fluorine-containing alcohol composite according to claim 2, wherein the organic silicon compound is tetra lower alkyl orthosilicate.

7. The method for producing a condensate according to claim 1, wherein the hydroxyl group-containing polymer is used at a 0.5 to 10 times ratio, and the zirconium compound is used at a 5 times or less ratio, based on the fluorine-containing alcohol.

8. The method for producing a condensate according to claim 1, wherein the organic silicon compound is used at a 5 times or less ratio, based on the fluorine-containing alcohol.

9. The method for producing a condensate according to claim 1, wherein the basic catalyst is an ammonia aqueous solution.

10. The method for producing a condensate according to claim 1, wherein the acidic catalyst is an inorganic acid.

11. A surface treatment agent, comprising the fluorine-containing alcohol composite according to claim 1, as an active ingredient.

12. The surface treatment agent according to claim 11, which exhibits hydrophilic oil repellency.

13. A substrate with a coating film formed from the surface treatment agent according to claim 11.

* * * * *